Oct. 13, 1931. R. P. BROWN 1,826,986
CONTROL METHOD AND APPARATUS
Filed June 11, 1927 5 Sheets-Sheet 3
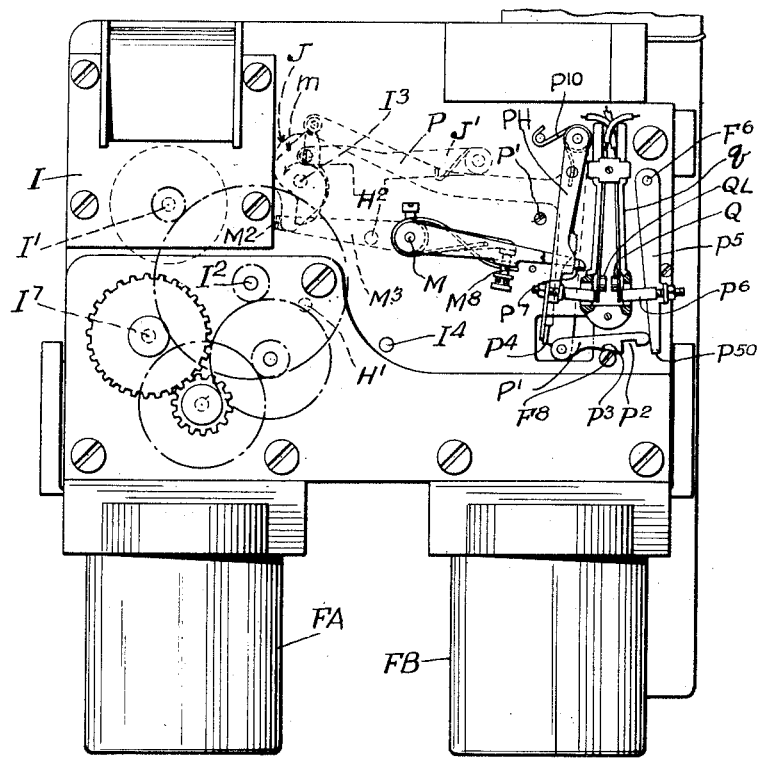
Fig. 3.
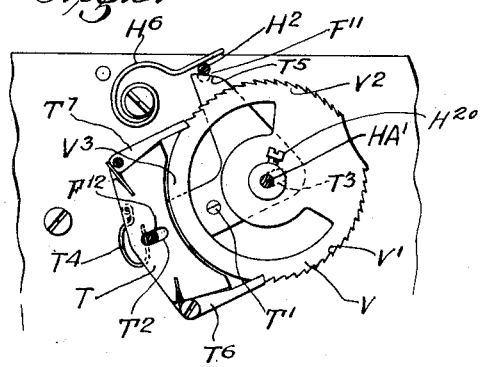
Fig. 5.
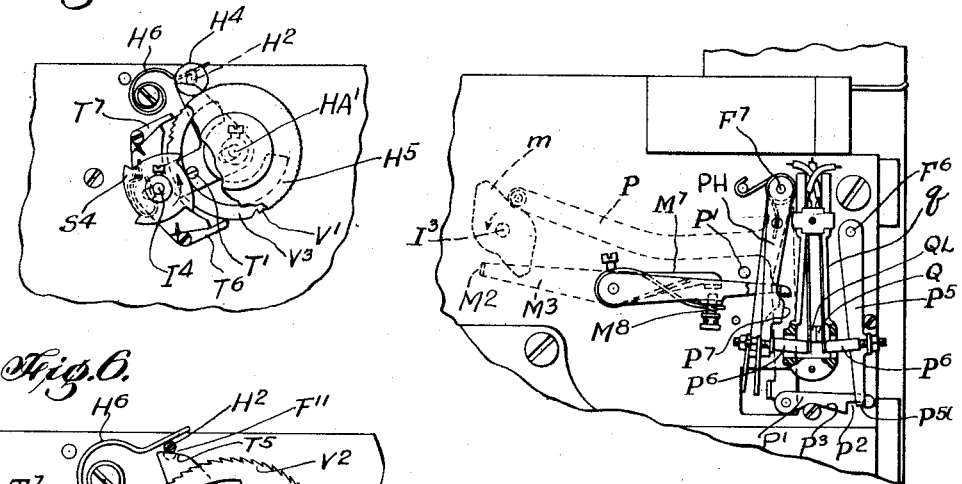
Fig. 6.
Fig. 4.
INVENTOR
RICHARD P. BROWN
BY
John E. Hubbell
ATTORNEY

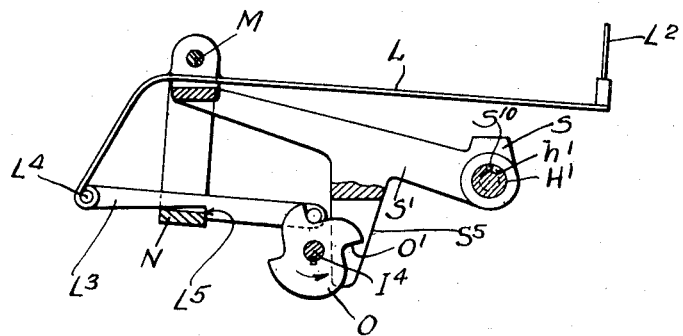
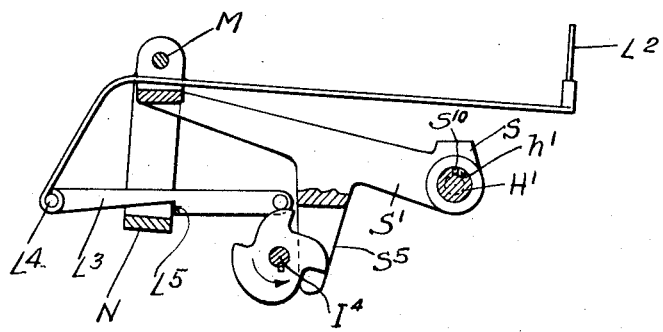
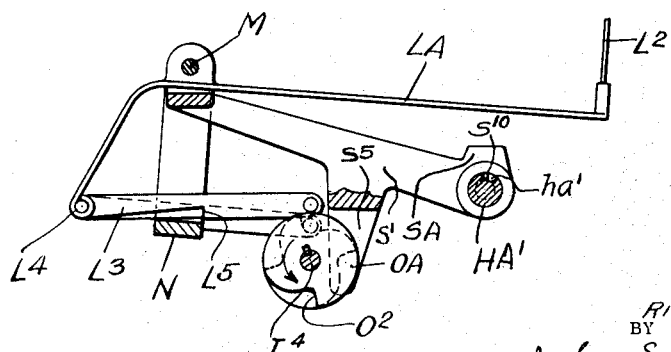

Oct. 13, 1931.　　　R. P. BROWN　　　1,826,986
CONTROL METHOD AND APPARATUS
Filed June 11, 1927　　　5 Sheets-Sheet 5

INVENTOR
RICHARD P. BROWN
BY
John E. Hubbell
ATTORNEY

Patented Oct. 13, 1931

1,826,986

UNITED STATES PATENT OFFICE

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA

CONTROL METHOD AND APPARATUS

Application filed June 11, 1927. Serial No. 198,298.

The general object of the present invention is to provide improved control methods and apparatus. More specifically, the object of the invention is to provide simple and effective control apparatus comprising improved means for exerting selective regulating effects in response to variations in a quantity, the value of which depends upon, or is modified by such effects.

My improved control apparatus comprises various novel features of construction and arrangement, and in its preferred form is characterized by the provisions made to produce a prompt and adequate adjustment and to prevent over-adjustment and resultant hunting or fluctuation in the value of the heating or other effect which it is desired to maintain constant, and to prevent objectionable variations in furnace operating conditions of the furnace or other apparatus with which our improved control apparatus is associated.

My invention was primarily devised, and is especially adapted for use in controlling the operation of tube stills or tubular oil heaters. In a form of construction preferred for some conditions of use, my invention comprises a novel control instrument including a galvanometer or other deflecting device responsive to furnace temperature and means controlled thereby for regulating the ratio of heat required by, to heat supplied to the furnace in a manner tending to maintain a constant furnace temperature; and in conjunction with the foregoing, a galvanometer or other device responsive to the furnace heating effect, as manifested by the temperature attained by the oil heated, for adjusting said mechanism to thereby increase or decrease the furnace temperature which said mechanism tends to maintain constant as required to maintain a desired or predetermined oil temperature.

In such a furnace control system as that just described, hunting is prevented, and a close temperature control is obtained primarily by regulation in response to furnace temperature so as to minimize fluctuations in the latter, and by a further regulation, when necessary, to compensate for variations in oil temperature. A furnace thermo-couple is much more responsive to a sudden change in the temperature of the furnace, than is a thermo-couple inserted in the oil which is heated by the furnace. The prompt response of the thermo-couple or thermo-couples in the furnace to temperature changes therein permits of a closer control of the furnace temperature, and results in less rapid variations in oil temperature than may be had with a control effected solely by a thermo-couple responsive to the oil temperature, and the use in conjunction with the furnace thermo-couple or thermo-couples, of the thermo-couple responsive to the oil temperature prevents the latter from drifting. The primary purpose of the described dual control is to hold a steady work (i. e., oil) temperature, and to this end I primarily control the heat input in response to the furnace temperature, and vary the furnace temperature which I maintain in response to any tendency of the work temperature to drift and so as to reduce such drift to a practical minimum.

The invention also comprises additional means for further minimizing the tendency to hunting, and insuring an exceedingly close control of the oil temperature. Said additional means may advantageously comprise means actuated by the deflection of the movable element of either or each of the above mentioned galvanometers away from its normal position relative to a corresponding control table to first adjust said table in a direction tending to diminish said deflection and then to gradually move said table back toward the position from which it was adjusted.

While the invention is of especial utility in controlling oil heating furnace, many features may advantageously be employed in any furnace in which a continuous work heating process is carried out, and various features of the invention are useful in instruments employed for purposes other than furnace control.

The various features of novelty which characterize the invention are pointed out with particularity in the claims annexed to and forming a part of this specification. For a better understanding of the invention however, its advantages and specific objects attained with its use, reference should be had to the drawings and descriptive matter in which I have described preferred embodiments of my invention.

Figure 2:
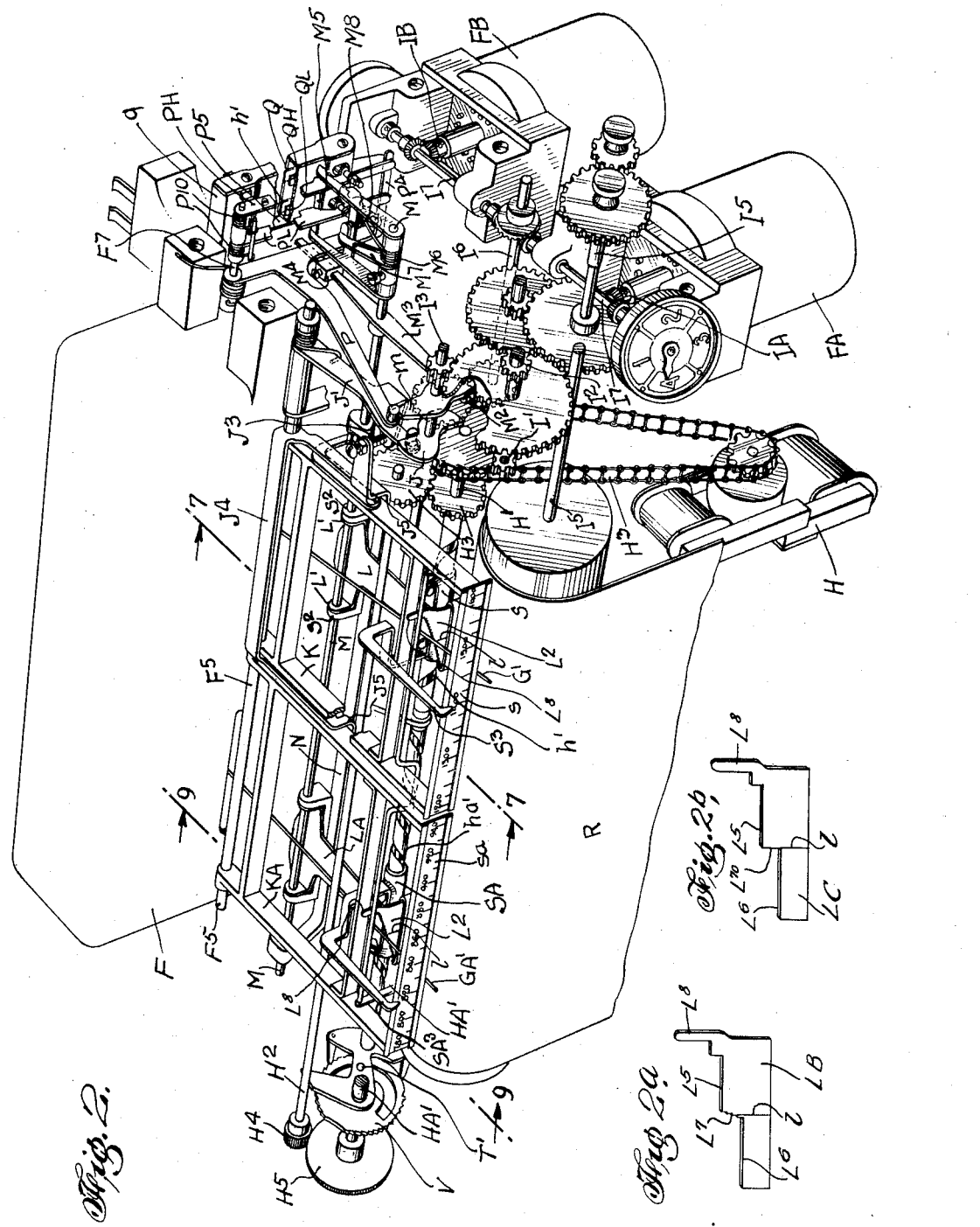
Fig. 2 is a perspective view, with parts broken away and omitted, of a control instrument which may be employed in the control system of Fig. 1.
Figure 10:
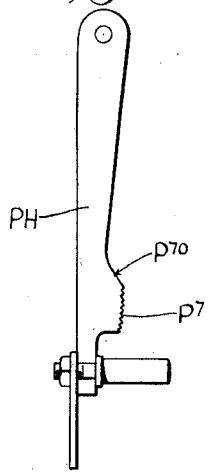
Figure 11:
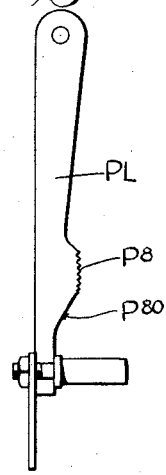
Figure 12:
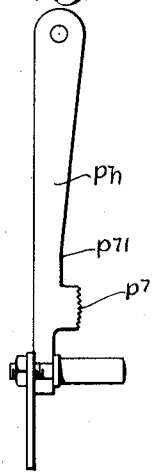
Figure 13:
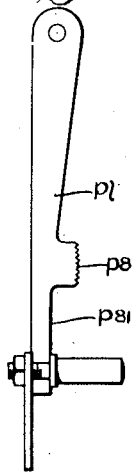
Figure 14:
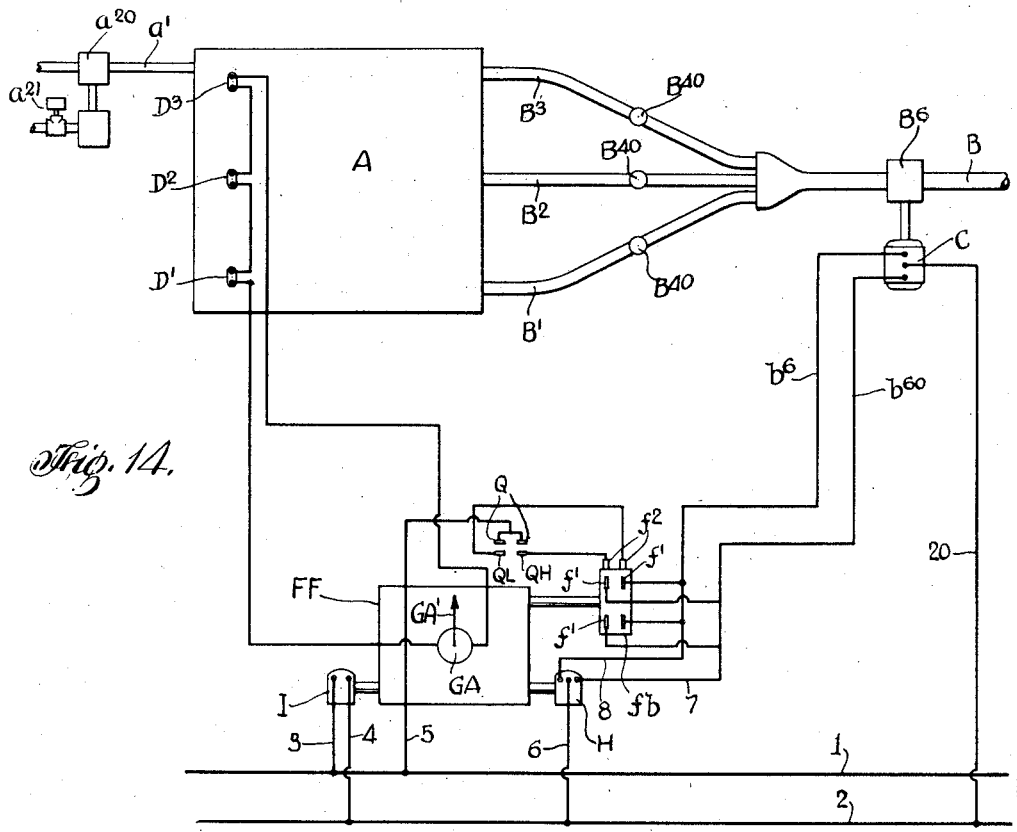
Figure 15:
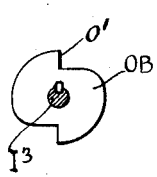

Figs. 2a and 2b, each illustrates a different modification of the control tables shown in Fig. 2;

Fig. 3 is an end elevation of the instrument shown in Fig. 2;

Fig. 4 is a partial end elevation, taken similarly to Fig. 3, with parts shown in different relative position from those occupied by them in Fig. 3;

Fig. 5 is an elevation with parts broken away and in section, showing a portion of an opposite end of the instrument from that shown in Fig. 3;

Fig. 6 is an end elevation taken similarly to Fig. 5, but on a larger scale, and with some of the parts shown in Fig. 5 omitted;

Fig. 7 is a partial sectional elevation, with parts omitted, taken on the plane indicated by the line 7—7 of Fig. 2;

Fig. 8 is a view taken similarly to Fig. 7 and illustrating the same parts in different relative positions;

Fig. 9 is a sectional elevation similar to Fig. 7 on the plane indicated by the line 9—9 of Fig. 2;

Figs. 10 and 11 are elevations of contact control levers employed in the instrument shown in Figs. 2 to 9, inclusive;

Figs. 12 and 13 are elevations of modifications of the control levers shown in Figs. 10 and 11, respectively;

Fig. 14 is a diagrammatic representation of a modified form of heater control system; and Fig. 15 is an elevation of a table control cam employed in a control instrument of Fig. 14.

Figure 1:
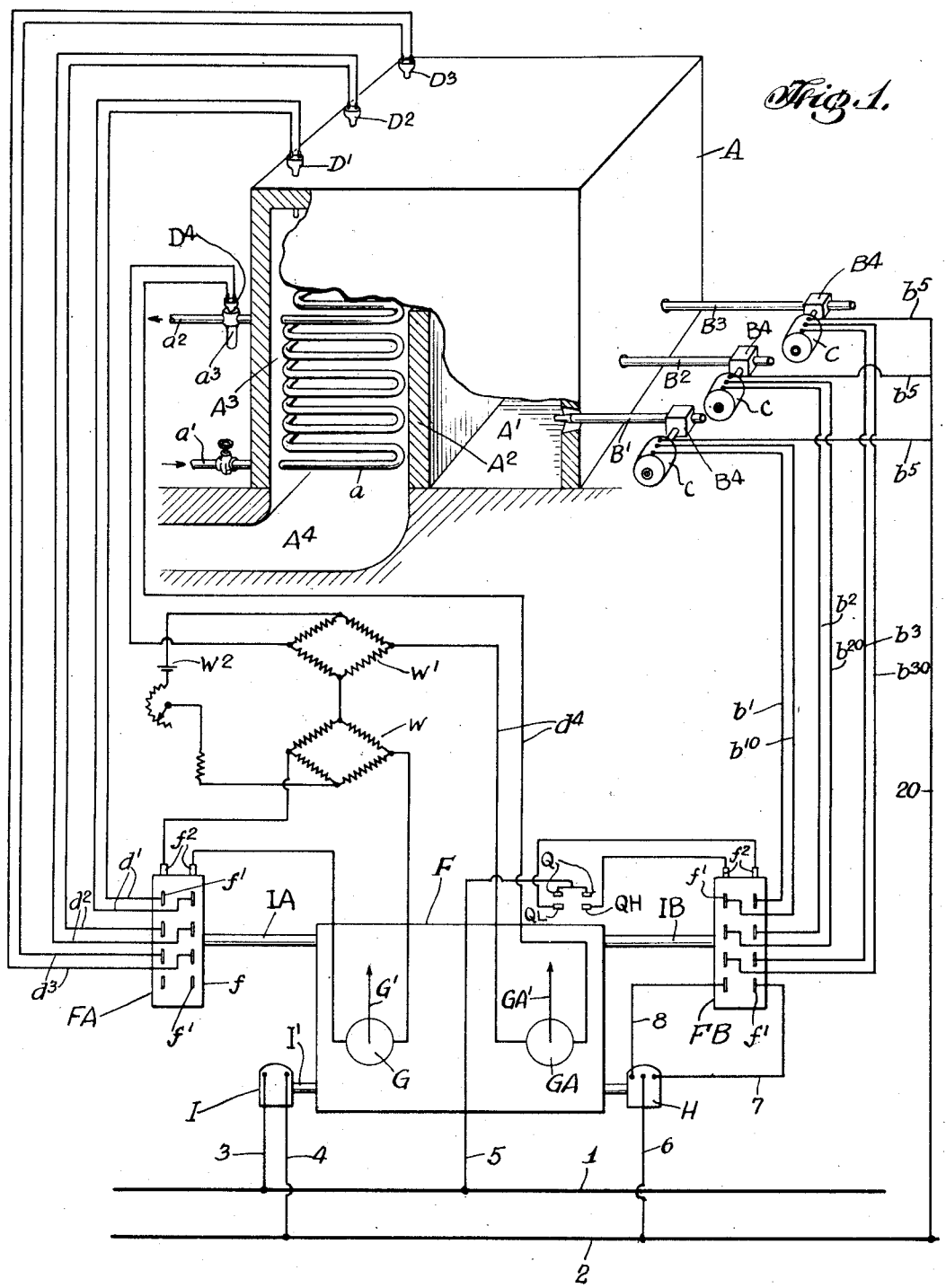
Fig. 1 is a diagrammatic representation of a tube still and control system therefor.

In Fig. 1, A is a conventional representation of a tubular oil heater or tube still of known type, and F is a control instrument for so regulating the supply of fuel to the combustion chamber A' of the heater A as to maintain an approximately constant predetermined desirable exit oil temperature, while at the same time avoiding undesirable fluctuations in combustion and furnace temperature conditions. The control instrument F comprises a galvanometer G responsive to furnace temperature conditions, a galvanometer GA responsive to the temperature to which the oil is heated, fuel regulating mechanism controlled by the galvanometer G and through which the latter tends to maintain a constant furnace temperature, and provisions controlled by the galvanometer GA modifying the action of the galvanometer G on the fuel regulating mechanism so as to increase or decrease the furnace temperature which the galvanometer G tends to maintain when necessary to maintain the temperature to which the oil is heated approximately constant at the predetermined value.

As shown in Fig. 1, the combustion chamber A' is heated by spaced apart burners, there being three of these burners, B', B² and B³, shown in Fig. 1. The amount of fluid fuel supplied to each of the burners B', B² and B³ is directly controlled by a corresponding throttle valve B⁴ which is adjusted by a corresponding reversible electric motor C. Each of the motors C is periodically energized for operation in one direction or the other by the control instrument F. The oil heater A, as conventionally illustrated, is formed with a bridge wall A² over which the heating gases pass into the upper end of a heating chamber A³, from the lower end of which the spent heating gases are withdrawn through a stack outlet connection A⁴. A bank of oil heating tubes a are located in the chamber A³. The oil to be heated passes to the bottom of the bank of tubes a through a supply pipe a', and a² is the delivery pipe through which the heated oil leaves the tubes a at the top of the bank of those tubes.

As shown, the furnace temperature to which the galvanometer G is responsive is measured by thermo-couples D', D² and D³, so located as to respond to local furnace conditions dependent upon, and which may be compensated for by the adjustment of the fuel supply to the burners B', B² and B³, respectively. As shown, the thermo-couples D', D² and D³ are located in the furnace above the bank of tubes a, so that the thermo-couples are not heated as highly as they would be if located in the combustion chamber A'. The burners B' and B³ enter the combustion chamber A adjacent the opposite ends of the latter, and the thermo-couples D' and D³ are correspondingly located adjacent the opposite ends of the furnace. The burner B² and the thermo-couple D² are each located intermediate the ends of the furnace.

The thermo-couples D', D² and D³ are periodically connected in regular succession to the galvanometer G through a thermo-couple switch FA forming a part of the instrument F and comprising, as diagrammatically shown in Fig. 1, a rotating body $f$ provided with contacts $f'$ arranged in two circumferentially extending rows. The terminals of the thermo-couple D' are connected by conductors $d'$, one to one, and the other to the second of a pair of side by side contacts $f'$. The terminals of the thermo-couple $D^2$ are connected to another pair of side by side contacts $f'$ by conductors $d^2$, and the thermo-couple $D^3$ has its terminals connected to a third pair of side by side contacts $f'$ by conductors $d^3$. Associated with the rotating contact carrying body $f$ are a pair of stationary contacts $f^2$ successively engaged by the different side by side pairs of contacts $f'$ as the body $f$ is rotated. The contacts $f^2$ are connected to the terminals of the galvanometer G which is thus connected successively to the terminals of the thermo-couples $D'$, $D^2$ and $D^3$ as the contact carrying body member $f$ of the thermo-couple switch FA is rotated.

The galvanometer GA as shown in Fig. 1, has its terminals connected by conductors $d^4$ to a thermo-couple $D^4$ responsive to the temperature to which the oil is heated. As shown, the thermo-couple $D^4$ is located in a thermometer well $a^3$ in the oil delivery pipe $a^2$, though under some conditions the thermometer well $a^3$ may well be located at some intermediate point in the path of oil flow through the tubes $a$.

The instrument F also comprises a burner control switch FB which may be, and as diagrammatically shown in Fig. 1, is identical in construction with the switch FA. The galvanometer G acts through the switch FB to control the energization of the various fuel supply adjusting motors C, and the galvanometer GA acts through the switch FB to control the energization of a reversible motor H forming a part of the instrument F. The motor H is employed, as hereinafter described, to modify the controlling action of the galvanometer G on the motors C when variations in the temperature to which the oil is heated make such modification desirable. In practice, the switches FA and FB may each well be oil immersed switches of the particular character disclosed in the patent to Thomas R. Harrison, No. 1,770,718 issued July 22, 1930.

The motors C are supplied with energizing current from supply conductors 1 and 2. The motor C adjusting the fuel supply valve $B^4$ for the burner $B'$, has three terminals, one of which, $b^5$, is connected to a branch 20 of a main supply conductor 2, while the other two terminals are connected through conductors $b'$ and $b^{10}$, respectively, to a pair of side by side contacts $f'$ of the switch FB. The stationary contacts $f^2$ of the switch FB are connected one to a control contact QH, and the other to a control contact QL of the instrument F. Associated with the contacts, QL, and QH is a contact Q connected by a branch conductor 5 to supply conductor 1. The instrument F operates to effect periodical engagement of the contact Q with one or the other of the contacts QL and QH, according to the adjustment required in the fuel supply valves $B^4$. In the position of the switch FB in which its contacts $f^2$ engage the contacts $f'$ connected to the conductors $b'$ and $b^{10}$, the motor C pertaining to the burner $B'$ will be energized to run in the direction necessary to decrease the amount of fuel supplied to the burner $B'$ if the contact QH is then in engagement with the contact Q, and will run in the opposite direction to increase the supply of fuel to the burner $B'$ if the contact QL is then in engagement with the contact Q. The other motors C are similarly controlled. The motor C pertaining to burner $B^2$ has one terminal $b^5$ connected to the conductor 2 and has other terminals connected by conductors $b^2$ and $B^{20}$ to contacts $f'$ of the switch FB, while the motor C for the burner $B^3$ has terminals connected to switch contacts $f'$ by conductors $b^8$ and $b^{30}$, and to the conductor 2 by a conductor $b^5$.

The reversible motor H to which reference has already been made, has one terminal connected by a branch conductor 6 to the supply conductor 2, and has its other two terminals connected by conductors 7 and 8 to a corresponding pair of side by side contacts $f'$ of the switch FB. When the last mentioned contacts engage the stationary contacts $f^2$ of the switch FB the motor H turns in one direction if the control contacts QL and Q are then in engagement, and turns in the opposite direction if the control contacts QH and Q are then in engagement. The instrument F comprises a timing or driving motor I by which the switches FA and FB and other movable parts of the instrument F, yet to be described, are actuated. The motor I may well be a so-called electric clock energized through branch conductors 3 and 4 from the main supply conductors 1 and 2 which ordinarily are connected to a source of alternating current.

Advantageously, and as shown in Fig. 1, the galvanometers G and GA are connected to the corresponding thermo-couples through Wheatstone bridge potentiometers W and W' shown as energized from a common current source $W^2$. Those skilled in the art will understand that that form of connection facilitates calibration and cold junction temperature compensation, and also makes it possible to confine the normal movement of the galvanometer pointers $G'$ and $GA'$ to comparatively narrow ranges.

The instrument F, in the form illustrated in Figs. 2 to 11, is a recording and control instrument in which the pointers $G'$ and $GA'$ of the galvanometers G and GA, respectively, are arranged side by side to swing over corresponding portions of a traveling chart or record strip R into contact with which the pointers are periodically depresesd by a depressor mechanism. The latter, as shown comprises separate depressor members K and KA for the pointers $G'$ and $GA'$, respectively. The depressor members K and KA are each pivotally mounted on a stationary shaft $F^5$ so that each tends to move under the action of gravity into the position to which it depresses the corresponding galvanometer pointer into contact with the chart R, but is normally held in an elevated position above the plane of pointer movement by a depressor actuating member $J^4$. The latter is pivotally mounted on the shaft $F^5$ and comprises forwardly extending arms terminating in fingers $J^5$ extending under portions of the members K and KA and normally holding the latter in their elevated position. The member $J^4$ is oscillated to raise the fingers $J^5$ and thereby the depressor members K and KA, and to depress the fingers $J^5$ thereby permitting the depressor members K and KA to move downward under the action of gravity, by a cam actuated lever $J'$. The latter is pivotally mounted on the shaft $F^5$ and is rigidly but adjustably secured to the member $J^4$ as by the screw connection $J^2$. The forward end of the lever $J'$ bears against a cam J carried by a rotating shaft $I^3$.

The shaft $I^3$ and other shafts $I^2$, $I^4$, $I^5$, $I^6$ and $I^7$, hereinafter referred to, are connected by suitable gearing (not necessary to illustrate or describe) to the shaft $I'$ of the timing or driving motor I. The shaft $I^5$ rotates the feed roll by which the record chart R is advanced, and the shaft $I^6$ through bevel gearing drives transverse shafts $I^7$, and the latter through bevel gearing rotate the actuating shafts IA and IB of the switches FA and FB. Associated with the needle $G'$ of the furnace temperature galvanometer G is a control table L which is pivotally mounted on a rock shaft M journalled in the instrument frame work. The control table L is not only freely rotatable on the rock shaft M, but is adjusted longitudinally of the latter in response to changes in the oil temperature, as hereinafter explained. At its front end the control table L is provided with an upturned pointer engaging portion $L^2$. The upper edge of the latter is not horizontal but is inclined or formed in steps which may be regularly disposed as shown in Fig 2, or may be otherwise arranged as shown in Fig. 2a, and in any event, serves to make the extent of turning movement of the control table L necessary to elevate the pointer engaging portion $L^2$ of the table into contact with the pointer $G'$ depend upon the position of the pointer $G'$, the upward movement of the portion $L^2$ being greater for a relatively low furnace temperature condition than for a relatively high furnace temperature condition.

The control table L is periodically oscillated to lift the portion $L^2$ to contact with the pointer $G^1$ by an actuator in the form of a bar N, having a body portion parallel to the shaft M and transversely extending end portions secured to the rock shaft M. The latter, and thereby the bar N, is oscillated by means of a cam m carried by the constantly rotating shaft $I^3$ and bearing against the upper edge of an offset portion $M^2$ of a lever $M^3$ secured to the rock shaft M. A counter-weight $M^4$ carried by the lever $M^3$ turns the shaft M in the clockwise direction as seen in Fig. 3 when the cam m permits such movement.

The control table L is intermittently connected to the rock shaft M so as to share the rotative movement of the latter in the counter-clockwise direction as seen in Fig. 7, by means of a latch bar $L^3$ pivotally connected at $L^4$ to a depending portion of the control table. The latch bar $L^3$ is formed with a shoulder $L^5$ which is engaged by the front edge of the bar N, and the control table thereby caused to turn with the rock shaft M, when the latch bar is permitted to move under the action of gravity into the position in which such engagement may occur. Except at periodical intervals, the latch bar $L^3$ is held up out of engagement with the bar N by a cam O splined on the constantly rotating shaft $I^4$, and moved along the latter by a fork portion $S^5$ of the member S when the latter is adjusted as hereinafter described. The cam O is formed with a plurality of notches $O'$ into which the free end of the latch bar may successively drop as the rotation of the cam O proceeds. The notches $O'$ are so disposed that the control table portion $L^2$ will be moved upward into engagement with the galvanometer pointer $G'$, while each of the different thermo-couples $D'$, $D^2$ and $D^3$ is connected to the galvanometer G.

Associated with the pointer $GA'$ of the oil temperature galvanometer GA is a control table LA. The control table LA and associated parts may be identical with the control table L and associated parts, except for the contour of the cam OA carried by the shaft $I^4$ and controlling the engagement of the bar N with the latch bar $L^3$ carried by the control table LA. The cam OA is provided with a latch bar receiving notch $O^2$ so disposed relative to the notches $O'$ of the cam O that the table LA will be oscillated to raise its portion $L^2$ only at the end of the series of oscillations of the table L which follow the successive connections of the thermo-couples $D'$, $D^2$ and $D^3$ to the galvanometer G.

With either control table L and LA connected through the corresponding latch bar $L^3$ to the bar N, the turning movement of the rock shaft M in the table elevating direction is arrested by the engagement of the control table with the corresponding galvanometer pointer. The angular position of the rock shaft M when its motion is thus interrupted determines which, if either of the control contacts QL and QH is then to be engaged by the control contact Q, and also determines the duration of such engagement if effected. In the form illustrated, the provisions through which the position of the rock shaft M determines the control contact engagement, includes a selector member comprising a bar $M^5$ carried by arms pivotally mounted on the shaft M. The selector is connected to the shaft M by a yielding connection which tends to turn the selector about the axis of the shaft M with the latter, but yields to permit the selector to be held stationary when the latter is operatively engaged by the cam portion of either of a pair of contact actuating levers PH and PL. As shown, this yielding connection is formed by a spring $M^6$ coiled about the shaft M and having one end secured to the selector and the other end secured to an arm $M^7$ rigidly secured to the shaft M. As shown, the selector $M^5$ is provided with an adjustable abutment $M^8$ through which the arm $M^7$ positively moves the selector with the shaft M during the table elevating movement of the shaft M.

The contact actuating levers PL and PH are mounted on, and depend from a stationary shaft $F^7$ and carry at their lower ends adjustable contact engaging parts $P^6$ which project into a switch housing $q$ into engagement with the contacts QH and QL, respectively, located in said housing. Each of these contacts comprises a spring supporting arm shaped to normally hold the contact away from the cooperating contact Q. The latter, which is a double contact located within the housing $q$, also comprises a spring supporting arm shaped to normally hold it away from the contacts QL and QH. Springs $P^{10}$ urge the levers PL and PH toward the housing $q$.

The bar portion $M^5$ of the selector serves as a stop against which one or both of the levers PL and PH may so bear, that one or the other of the levers is prevented from moving the corresponding contact QL or QH into position in which it can be engaged by the contact Q, while at the same time the other lever may or may not be held at a predetermined distance away from the switch housing $q$. Which of the levers PL and PH is thus held in a wholly operative position, and the extent, if any, to which the other lever is displaced from the switch housing $q$ by the selector bar $M^5$ depends upon the position of the latter, and upon the form given to the rear edges of the levers.

When the bar $M^5$ is in the position in which the shaft M tends to hold it when the control table elevating movement of the shaft M is arrested by the engagement of the controlling galvanometer needle $G'$ or $GA'$ with the corresponding control table at the neutral point, or at the low side of the neutral point of the control table, a portion $P^7$ of the lever PH engages the bar $M^5$, and the lever PH is thereby prevented from pushing the contact QH into a position in which it engages the contact Q. When, however, the position of the selector bar $M^5$ corresponds to a deflection of the controlling galvanometer pointer to the high side of the neutral point of the corresponding control table, the bar $M^5$ is in position to be engaged by a portion $P^{70}$ of the lever PH. The lever PH is then permitted to approach the switch housing $q$ and so permit the contacts QH and Q to come together as hereinafter explained. The portion $P^{70}$ is shown as so shaped that the extent to which the lever PH is permitted to approach the housing $q$ increases as the elevation of the bar $M^5$ above its intermediate or neutral position increases.

The lever PL is provided with a portion $P^{80}$ which graduates the approach of the lever PL toward the housing $q$, when the bar $M^5$ is in a position corresponding to a displacement of the controlling galvanometer pointer to the low side of the neutral point of the corresponding control table. The lever PL is also provided with a portion $P^8$ which prevents it from moving the contact PL into the range of movement of the contact Q, when the controlling galvanometer pointer is at, or on the high side of the neutral point of the control table.

To insure that the bar $M^5$ after being engaged by one or the other of the levers PL and PH does not move upward as soon as the shaft M begins its table depressing movement the edges of the portions $P^7$ and $P^8$ may be roughened or notched so that an engagement, once established between such portion of either lever and the bar $M^5$, will not be interrupted until the lever is positively moved away from the switch housing $q$ to release the bar $M^5$ as hereinafter explained. It is to be understood that the actual location of the neutral point $l$ of each control table is that corresponding to the position of the selector bar $M^5$ in which the latter serves to hold both levers PH and PL against moving the contacts QH and QL, respectively, into positions in which they may be engaged by the contact Q. With the pointer engaging edges of the control table parts $L^2$ formed in a series of regularly disposed steps as shown in Fig. 2, the deflection of the controlling galvanometer through a relatively wide range in either direction from the neutral point results in a corresponding range of variation in the position of the bar $M^5$. In practice, however, it is sometimes desirable to have a small galvanometer displacement produce the full range variation in controlling position of the bar $M^5$, and this effect is secured by giving the control portions $L^2$ the special form shown in Fig. 2a.

The contact Q is periodically moved toward the contacts QH and QL by means of a lever P fulcrumed on the shaft $F^7$ and engaging the upper side of the cam $m$ carried by the shaft $I^8$. A depending portion of the lever P has pivotally connected to it a drag or latch bar P' formed with a notch P² at its underside into which a horizontal portion P⁵⁰ of the lever P⁵ is received when the parts are in the position shown in Fig. 4. As the lever P is turned by the cam $m$ in the clockwise direction from the position shown in Fig. 4, the bar P' is moved into the position shown in Fig. 3. As the bar P' thus moves from the position shown in Fig. 4 into that shown in Fig. 3, a cam portion P³ of the bar P' rides up on a stud F³ carried by the instrument framework thereby lifting the rear wall of the notch P² above the level of the portion P⁵⁰. Until the lever P⁵ is thus released from the latch bar P', the lever moves with the latch bar and thereby moves the contact Q toward the contacts QL and QH. When the latch bar P' releases the lever P⁵ the contact Q springs back, thus quickly separating the contact Q from either of the contacts QL and QH with which it may previously have been in engagement.

The lever P is also provided with an arm P⁴ at the rear of the levers PL and PH which engages the lower ends of the latter and moves them away from the switch housing $q$ as the lever P nears the limit of its movement in the clockwise direction as seen in Figs. 3 and 4. The movement thus given to the levers PL and PH releases the selector bar M⁵ from its engagement with either of the levers previously in engagement with it. The parts are so relatively arranged and timed that the levers PL and PH are held by the arm P⁴ out of position to engage the selector bar M⁵ during the periods in which the rock shaft M is turning in the table elevating position. The continued rotation of the cam $m$ permits the lever P to swing back and permit the levers PL and PH to move back toward their normal positions at the end of each table elevating movement of the rock shaft M and before the return movement of the shaft M begins.

With the selector bar M⁵ in the position corresponding to a displacement of the controlling galvanometer pointer in either direction from the neutral position the levers PL and PH are so held that one of the contacts QL or QH will not be engaged on the subsequent advance movement of the contact Q. The other contact, however, will be engaged by the contact Q early or late in its advancing movement, dependent on what portion of the cam portion of the corresponding contact actuating lever PL or PH is in engagement with the selector. The separation of the contact Q, from whichever of the contacts QL or QH it may have been in engagement with, occurs always at the same point in the movement of the shaft I³ carrying the cam $m$, and the duration of each engagement of the contact Q with the contact QL or the contact QH therefore depends upon the extent of displacement of the controlling galvanometer pointer from its neutral position with respect to the corresponding control table. In consequence, the period during which any one of the motors C and the motor H is operated at any one time depends upon the displacement of the controlling galvanometer pointer from its neutral position.

As already indicated, the position of the control table L longitudinally of the rock shaft M depends upon the oil temperature. The means by which the table L is adjusted longitudinally of the shaft M comprises a carriage S mounted on the shaft H' and provided with a projection S¹⁰ entering a helical groove or cam-way $h'$ formed in the shaft H'. The carriage S is provided with an extension arm S' carrying apertured ears S² located at opposite sides of the ears L' of the table L and through which the shaft M extends. In consequence, as the shaft H' is rotated in one direction or the other the carriage S is adjusted longitudinally of the shaft M. Advantageously, the carriage S is provided with an indicator arm S³ which cooperates with a scale $s$ carried by the depressor frame K to indicate the furnace temperature required to bring the pointer G' above the neutral point of the table portion L².

The reversible motor H when energized rotates the shaft H' in one direction or the other depending upon which of the energizing circuits of the motor H is energized. As shown, the driving connection between the shaft and the motor H includes a sprocket chain H³. The energization of the motor H in one direction or the other is affected by the engagement of the portion L² of the control table LA with the galvanometer pointer GA', accordingly as the pointer is at one side or the other of the neutral position of the table when engaged. When the oil temperature is below the predetermined desired value, the pointer GA' will be engaged by the portion L² of the table LA at the low side of the neutral position of the latter and the motor H will then be energized to move the control table L to the right as seen in Fig. 2 and thereby increase the furnace temperature which the interaction of the table L and galvanometer pointer G' tends to maintain. Conversely, when the oil temperature is above the predetermined value, the motor H is energized in the direction to adjust the table L to the left as seen in Fig. 2.

To prevent hunting and over-adjustment of the control table L longitudinally of the shaft M on a departure in the oil temperature from the normal or predetermined value in either direction, means are provided for adjusting the control table LA longitudinally of the shaft M in a direction opposite to the adjustment of the control table L produced by rotating the shaft H in either direction. This result is secured by means of a carriage SA mounted on a shaft HA' in axial alignment with the shaft H'. The carriage SA is cooperatively related with the control table LA as the carriage S is related with the table L. The cam engaging projection S' of the table LA enters a helical groove or cam-way $ha'$ formed on the shaft HA'. The carriage SA is also provided with a pointer $SA^3$ cooperating with the scale $sa$ carried by the depressor frame KA.

Means are provided for giving the shaft HA' rotative movements proportional to those of the shaft H' when the latter is rotated so that a given displacement of the table L longitudinally of the shaft M will result in a proportional adjustment of the table LA in the opposite direction along the shaft M. This result is obtained in the construction shown by means of a shaft $H^2$ connected at one end by spur gears $H^3$ to the shaft H', and carrying at its other end a spur gear $H^4$ adapted to engage and rotate a spur gear $H^5$ carried by the shaft HA'. Advantageously, and as shown, the ratio of the two gears $H^3$ is different from the ratio of the gears $H^4$ and $H^5$ so that the angular adjustment of the shaft HA' is less than that of the shaft H' since in ordinary practice the table L requires more adjustment than does the table LA. When, as in the construction shown, the rotation of the shaft H' produces a corresponding rotation in the same direction of the shaft HA', the helical cam grooves $h'$ and $ha'$ should be oppositely inclined.

Whenever the table LA occupies a position displaced longitudinally of the shaft M from the normal position in which the neutral point $l$ of the table LA is in register with the point on the scale $sa$ corresponding to the oil temperature which the apparatus is adjusted to maintain, the table LA is subjected to an adjustment tending to return the table to its said normal position. The means disclosed herein for effecting this return adjustment of the table LA comprises a cam $S^4$ carried by the constantly rotating shaft $I^4$, a member T given reciprocating movements by the cam $S^4$, a ratchet disc V secured to the shaft HA', and pawls $T^6$ and $T^7$ carried by the member T and engaging the teeth V' and $V^2$ on the ratchet disc V so as to periodically rotate the latter and thereby the shaft HA' in whichever direction is required to move the table LA toward its normal position.

As shown, the member T is moved by the cam $S^4$ radially of the shaft HA' being guided in its movements by a pin $F^{12}$ carried by the instrument framework and passing through an elongated slot $T^2$ formed in the member T, and by the engagements of the walls of another slot $T^3$ in the member T with the shaft HA'. The high points on the cam $S^4$ successively engage a stud T' carried by the member T, thereby moving the latter toward the shaft HA'. The return movement of the member T, when permitted by the cam, is effected by a spring $T^4$. The teeth of the member V are formed in two sets V' and $V^2$, each of which face toward a smooth intervening peripheral portion of the member V, at the ends of which the pawls $T^6$ and $T^7$ idly engage the disc V when the table LA is in its neutral position. When the table LA is displaced from its normal position in the counter-clockwise direction as seen in Fig. 5, on each inward movement of the member T effected by the cam $S^4$, the pawl $T^6$ moves idly over the smooth portion $V^3$ to the member V, while the pawl $T^7$ engages one of the teeth $V^2$ and thus rotates the member V and thereby the shaft HA' in the clockwise direction. Conversely, when the adjustment of the table LA is in the opposite direction, the pawl $T^7$ idly engages the smooth portion of the member $V^3$ of the member V, when the member T is actuated by the cam $S^4$, while at the same time the pawl $T^6$ engages one of the teeth V' and thereby rotates the member V in the counter-clockwise direction.

The spur gears $H^4$ and $H^5$ are disengaged during the periods in which the member T is angularly adjusting the shaft HA'. To this end in the instrument shown, the shaft $H^2$ is mounted near its end carrying the gear $H^4$ in a slot $F^{11}$ in the instrument framework, and the member T is formed with an arm having a cam edge portion $T^5$ which engages the shaft $H^2$ and raises the latter far enough to disengage the teeth of the gears $H^4$ and $H^5$ on each inward movement of the member T. A spring $H^6$ returns the shaft $H^2$ to the bottom of the slot $F^{11}$, when the retrograde movement of the cam edge $T^5$ permits. In practice, the long slow-turning shaft $H^2$ is made sufficiently flexible to accommodate the action on it of the cam edge $T^5$.

In the contemplated mode of use of the apparatus shown in Figs. 1 to 11 inclusive, the temperature in the different portions of the furnace are kept uniform by periodically connecting first one and then another of the thermo-couples D', $D^2$ and $D^3$ to the galvanometer G, and thereby adjusting fuel supplies to the burners B', $B^2$ and $B^3$ as required to make the temperature measured by each thermo-couple approximate the temperature indicated on the scale $s$ by the pointer $S^3$. The furnace temperature which the apparatus thus tends to maintain is that required to give the predetermined exit oil temperature. The last mentioned temperature is that indicated by the pointer $SA^3$ on the scale $sa$ when the control table LA is in its normal position, in which the members T and V have the relative positions shown in Fig. 6.

The predetermined exit oil temperature which the apparatus tends to maintain may be varied when and as conditions require by adjusting the member V angularly with respect to the shaft HA', the set screw $H^{20}$ being loosened to permit this adjustment.

When, on any periodical depression of the galvanometer pointer GA', the latter engages the control table LA at the high or low side of the neutral point $l$ of the table, the motor H is set into operation to adjust the control table L to the left or right respectively, and to simultaneously adjust the control table LA in the opposite direction. The adjustment of the control table L, thus produced, decreases or increases the furnace temperature which the galvanometer G and associated control mechanism tend to maintain, accordingly as the exit oil temperature is above or below the predetermined value.

The simultaneous adjustment in the opposite direction of the control tables L and LA followed by the subsequent gradual return of the latter to its normal position, tends to eliminate over-adjustments or hunting and consequent fluctuations in the exit oil temperature, which might otherwise occur. The described automatic adjustments of the table LA serve particularly to compensate for the fact that changes in the temperature to which the oil is heated lag behind the changes in furnace temperature condition producing such changes in oil temperature.

On a departure in the exit oil temperature from the predetermined value, a single corrective adjustment of the table L and resultant increase or decrease in the furnace temperatures maintained, may well be sufficient, in many cases, to produce the desired increase or decrease in oil heating effect; but owing to the time lag between changes in furnace temperature and the resultant changes in oil temperature, a change in furnace temperature may not manifest its full effect on the exit oil temperature until after a period of time appreciably greater than the intervals desirable between successive depressions of the galvanometer pointer GA'. In consequence, the next depression of the galvanometer pointer GA' following and adequate adjustment of the control table L, would, but for the simultaneous adjustment of the table LA, result in a second and unnecessary adjustment of the table L. Such a tendency to over-adjustment and hunting is avoided or greatly minimized with the apparatus shown in Figs. 1 to 11 by the simultaneous adjustments in opposite directions of the tables L and LA, and the gradual return of the latter at a rate more or less closely approximating that at which the oil temperature varies as a result of a normal or average change in furnace temperature. If, as a result of the change in furnace temperature, the exit oil temperature returns to the predetermined value at the same rate as the table LA is returned to its normal position by the operation of the member T on the member V, successive depressions of the galvanometer pointer GA' during the period in which the oil temperature is being changed back to its normal value, will cause the pointer GA' to engage the portion $L^2$ of the table LA at the neutral point $l$, and therefore will not produce any change in the position of the table L. If, because the first adjustment of the table L is greater or less than required or for other cause, the oil temperature and the table LA do not return to normal at the same rate, the depression of the galvanometer pointer GA' will result in a corrective adjustment of the table L, but, with the graded control provided in Figs. 1 to 11, the extent of adjustments of the table L produced while the table LA is out of its normal position will be restricted more or less closely to the exact amount required.

With the construction illustrated in Figs. 1 to 11, the duration of any engagement of the contact Q with either of the contacts QL or QH depends upon the extent of the displacement of the pointer G' or GA' from the neutral point $l$ of the corresponding control table L or LA, and is determined in part by the contour of the pointer engaged edge of the portion $L^2$ of the control table which fixes the position of the selector $M^5$, and in part by the contour of the edges of the contact levers PL and PH engaging the selector $M^5$. With the pointer engaging edge of the portion $L^2$ of the control table regularly inclined in a series of steps as shown in Fig. 2, the positions assumed by the selector $M^5$ will vary with the extent of galvanometer pointer departure from the neutral point $l$ of the table L throughout the entire range of movement of the pointer G' or GA' above the portion $L^2$ of the corresponding table L or LA.

The pointer engaging portion of the modified form of control table LB shown in Fig. 2a has an elevated horizontal portion $L^5$ at the high side of the neutral point $l$, and a lower horizontal portion $L^6$ at the low side of the neutral point, and an intermediate steeply inclined portion $L^7$ formed of a series of steps. With control tables like that illustrated in Fig. 2a in place of the tables L and LA, the graduated control of the position of the selector $M^5$ is restricted to the small range of movement of the pointer G' or GA' in which the pointer is above one or another of the steps forming the corresponding table edge portion $L^7$. With the pointer above the horizontal table portion $L^5$, at any point along the length of the latter, the maximum period of engagement between the contacts Q and QH is had, and with the pointer G' above any point along the horizontal edge portion $L^6$ the maximum period of engagement of the contacts Q and QL is had.

While the contour of the control table portion $L^2$ engaged by the galvanometer pointer determines the position of the selector $M^5$, the actual period of contact engagement depends both on the position of the selector $M^5$ and on the contour of the edges of the contact levers PL and PH engaging the selector. With the contact levers PH and PL formed with the inclined portions P⁷⁰ and P⁸⁰ as shown in Figs. 1 to 11, each different position of the selector $M^5$ above its neutral or intermediate position gives a different position for the lever PH when the latter is in engagement with the selector, and consequently a different period of engagement between the contacts Q and QH. Similarly, each different position of the selector $M^5$ below its neutral or intermediate position, determines a different position for the contact lever PL, and gives a different period of engagement of the contacts Q and QL. Advantageously, as shown, each contact table, whatever the contour of its active engaging pointer edge may be, is provided with a guard finger $L^8$ preventing the cooperating galvanometer pointer from moving off the table at its high side.

While graduated control of the motors C and H is ordinarily desirable, it may not be required in some cases, and, where not required, the levers PH and PL of Figs. 1 to 11 may be replaced by the levers $ph$ and $pl$ shown in Figs. 12 and 13, respectively. With the contact lever $ph$ shown in Fig. 12, the maximum period of engagement of the contacts Q and QH will occur whenever the selector $M^5$ engages the portion $p^{71}$ of the lever $ph$ above its serrated portion $p^7$, and the maximum period of engagement of the contacts Q and QL will occur whenever the selector $M^5$ engages the portion $p^{81}$ of the lever $pl$ below its serrated portion $p^8$. With the contact control levers shown in Figs. 12 and 13, the pointer engaging portions of the control tables would ordinarily be of the form shown in Fig. 2b. The table LC shown in Fig. 2b differs from the table LB shown in Fig. 2a only in that the edge portion $L^7$ of Fig. 2a is replaced by a smooth vertical edge $L^{70}$ in register with the neutral point $l$ of the table.

Various novel features of the control system shown in Fig. 1, and of the instrument shown in Figs. 2 to 11, inclusive, may be used with advantage in other types of control systems and control instruments, such for example as the control system and instrument illustrated in Figs. 14 and 15. In the particular form of control system shown in Fig. 14, A represents a tubular oil heater which may be identical with that shown in Fig. 1. In Fig. 14, however, the aggregate supply of oil to the three burners B', $B^2$ and $B^3$ is controlled by a single automatically adjusted valve $B^6$, a pipe B supplying oil to all three burners, and the distribution of the oil supplied among the different burners B', $B^2$ and $B^3$ may be controlled by means of an individual manually adjustable valve $B^{40}$ associated with each burner. The reversible motor C by which the valve $B^6$ is adjusted, is controlled in Fig. 14 by a control instrument FF including a single galvanometer GA which, as shown, is responsive to furnace temperature, and not to the temperature to which the oil is heated.

The control instrument FF may be identical with the control instrument F, except for the omission of the galvanometer G and associated parts including the control table L and shaft H', and except for the contour of its table controlling cam OB, replacing the cam OA of the instrument F. As shown in Fig. 14, the galvanometer GA is made responsive to the furnace temperature by connecting three thermo-couples D', $D^2$ and $D^3$ in series with one another and with the terminals of the galvanometer GA. This mode of connection makes the galvanometer more directly responsive to average furnace temperature conditions than it would be if one or two of the three thermo-couples were omitted. In the control instrument FF, the switch $fb$, replacing the generally similar switch FB of the insrument F, is shown as having one of each pair of side by side contacts $f'$ connected to one terminal of the valve adjusting motor C by a conductor $b^6$, and also connected to one terminal of the motor H by a conductor 8, while the other contact $f'$ of each pair is connected to another terminal of the motor C by a conductor $b^{60}$ and to another terminal of the motor H by a conductor 7.

With this arrangement the motor H and the motor C will each be operated to turn in one direction or the other whenever a side by side pair of contacts $f'$ is engaged by the stationary contacts $f^2$ provided at the time of such engagement the pointer GA is laterally displaced from the neutral point $l$ of the control table LA and one or the other of the contacts $f^2$ is then energized. The cam OB controlling the elevation of the single control table of the instrument FF should ordinarily be formed with as many shoulders and notches O' as there are side by side pairs of contacts $f'$ in the switch $fb$.

In the intended operation of the particular form of control system shown in Fig. 14, a predetermined furnace temperature is maintained by adjusting the member V relative to the shaft HA' so that in the normal position of the member V the galvanometer pointer GA' will be above the neutral point of the control table LA, when the furnace temperature condition to which the galvanometer GA responds is at a certain normal or predetermined value. On a variation in the furnace temperature from the predetermined value, the corresponding contact QL or QH will engage with the contact Q, and the motor C will be operated to adjust the valve $B^6$ so as to increase or decrease the fuel supply to the burners, and at the same time the motor H will be energized to adjust the table LA of the instrument FF to move the neutral point of the latter to the low or high side respectively, of its neutral position. After each such adjustment of the control table the latter is gradually returned to its normal predetermined position by the action of the member T as in the construction first described.

In the intended operation of the system shown in Fig. 14, the normal position of the control table LA should be such as to maintain the furnace temperature adapted to give the desired exit oil temperature under the particular condition of operation. In practice the shaft HA is adjusted relative to the member V from time to time to vary the furnace temperature which the control system tends to maintain. For example, when a tubular oil heater is initially started into operation following a periodically required tube cleaning operation, a lower furnace temperature is required to heat the oil to a given exit temperature than is required after the apparatus has been in operation for some time and carbon deposits on the inner walls of the tubes have increased the furnace temperature required to heat oil passing through the apparatus at a given rate to the same exit temperature. With the apparatus shown in Fig. 14, the member V of the control instrument may be adjusted relative to the shaft HA every few hours to increase the combustion chamber temperature which the apparatus maintains and thus compensate for the increasing amount of carbon deposits on the tube walls.

With the control system shown in Fig. 14, it is in general, desirable to maintain a constant, or at least a predetermined rate of oil flow through the tubes of the oil heater. This result may be secured with the arrangement shown in Fig. 14, by means of an oil feed pump $a^{20}$ supplying oil to the heater inlet $a'$ at a rate determined by a pump governor $a^{21}$ which may be of any usual or suitable type.

In the instrument FF, as in the instrument F, the displacement of the table LA by the motor H, and the subsequent return of the table to its previous position by the interaction of the members T and V and associated parts, minimizes the tendency to over-adjustment and hunting, and this common feature of the control instruments F and FF, as well as other novel features illustrated and described herein, may well be employed in other forms of apparatus and control systems than those specially illustrated herein. This application is in part a continuation of my prior application Serial No. 84,077, filed January 27th, 1926.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:—

1. In the operation of an oil heater for continuously heating oil to a refining temperature, the method which consists in regulating the relation of the rate of combustion in the heater to the rate at which oil to be heated is supplied to the heater to normally maintain an approximately constant temperature in said combustion chamber, and varying the temperature so maintained when necessary on a departure of the temperature to which the oil is heated from a predetermined value to thereby restore the last mentioned temperature to said value.

2. In a control instrument, the combination with two deflecting meter elements arranged side by side, two control members associated one with each of said elements and each adjustable in a path along which a portion of the corresponding element is moved as said element is deflected, said paths extending in the same direction, an actuator comprising a portion extending alongside each of said paths and having an oscillatory movement in a direction transverse to said paths, a rotating shaft extending alongside each of said paths, two cams splined on said shaft, one associated with each of said members and each moved longitudinally of said shaft in correspondence with the adjustments in its path of the corresponding member, and means controlled by each cam for connecting the corresponding member to and disconnecting it from said actuator.

3. In a control instrument, the combination with two deflecting meter elements arranged side by side, two control members associated one with each of said elements and each adjustable in a path along which a portion of the corresponding element is moved as said element is deflected, said paths extending in the same direction, an actuator comprising a portion extending alongside each of said paths and having an oscillatory movement in a direction transverse to said paths, a rotating shaft extending alongside each of said paths, two cams splined on said shaft, one associated with each of said members and each moved longitudinally of said shaft in correspondence with the adjustments in its path of the corresponding member, and means controlled by each cam for connecting the corresponding member to and disconnecting it from said actuator, said cams being so relatively formed and disposed that neither member is connected to said actuator except when the other member is disconnected from said actuator.

4. In a control instrument, the combination with a deflecting meter element, of a control member, means periodically bringing said element and member into engagement with one another, means dependent on such engagements for exerting one or another of opposing control effects accordingly as the deflection of said element effects its displacement in one direction or another from a neutral position relative to said member, means dependent on said engagements for periodically adjusting said member in a direction tending to minimize said displacement, and means normally operating when said member is out of a predetermined position to move said member back into said position.

5. In a control instrument, a control member adjustable along a definite path, a deflecting meter element having a portion moving along said path as said element is deflected, means periodically bringing said element portion and member into engagement, means dependent on said engagement for exerting one or another of opposing control effects accordingly as the deflection of said element effects its displacement in one direction or another from a neutral position relative to said member, means also dependent on such engagement for periodically adjusting said member along said path in a direction tending to minimize said displacement, and means normally operative when said member is out of a predetermined position along said path to move said member back into said last mentioned position.

6. In a control instrument, the combination with a control member adjustable along a definite path, a deflecting meter element having a portion moving along said path as said element is deflected, means periodically moving said element portion and member into engagement with one another, means dependent on said engagements for exerting one or another of opposing control effects accordingly as the deflection of said element effects its displacement in one direction or another from a neutral position relative to said member, a screw in threaded engagement with said member and adapted when rotated to adjust said member along said path, means dependent on said engagements for periodically rotating said screw in the direction to so adjust said member as to minimize said displacement, and means normally operative, when said screw is out of a predetermined angular position, to rotate said screw in the direction to return the screw to said predetermined angular position.

7. In a control instrument, the combination with a deflecting meter element and a control member through which regulating effects dependent on the relative position of said element and member are exerted, of a second deflecting meter element, a second control member, and means dependent upon the relative positions of the last mentioned element and member for moving the first mentioned member and thereby changing the position of the latter relative to the first mentioned element.

8. In a control instrument, the combination with a deflecting meter element and a cooperating control member, of means associated therewith for exerting regulating effects dependent on the relative positions of said element and member, a second deflecting meter element, a second control member, and means dependent on the displacement of the last mentioned element from a neutral position relative to the last mentioned member for adjusting the first mentioned member relative to the first mentioned element in a direction dependent on the direction of said displacement.

9. In a control instrument, the combination with a deflecting meter element and a cooperating control member, of means associated therewith for exerting regulating effects dependent on the relative positions of said element and member, a second deflecting meter element, a second control member, and means dependent on the displacement of the last mentioned element from a neutral position relative to the last mentioned member for adjusting the first mentioned member relative to the first mentioned element by an amount depending on the extent of said displacement.

10. In a control instrument, the combination with a deflecting meter element, of a control member, means for exerting a regulating effect dependent on the relative positions of said element and member, a second deflecting meter element, a second control member, means dependent on the displacement of said second element from a neutral position relative to said second member for moving said second member in a direction to minimize said displacement, and for moving the first mentioned member in a direction dependent on the direction of said displacement, and means operating when said second member is out of a predetermined position to move said second member back into said predetermined position.

11. In a control instrument, the combination with a deflecting meter element, of a control member, means for exerting a regulating effect dependent on the relative positions of said element and member, a second deflecting meter element, a second control member, means dependent on the displacement of said second element from a neutral position relative to said second member for moving said second member in a direction to minimize said displacement, and for moving the first mentioned member in a direction dependent on the direction of said displacement, and means operating when said second member is out of a predetermined position to move said second member back into said predetermined position at a rate less rapid than that at which said member is moved in the above mentioned adjustment of the latter.

12. The method of operating a tubular oil heating furnace which consists in passing oil through the heater tubes at a definite rate, and regulating combustion in said furnace in response to a condition of furnace temperature which may vary relatively to the exit oil temperature as required to maintain said temperature at a definite value, and varying the furnace temperature maintained from time to time to compensate for changes in conditions of operation which vary the furnace temperature required to secure a predetermined exit oil temperature.

13. In a control instrument comprising two meters responsive to different but related conditions and each including a deflecting element and a cooperating control member, of a selector, means for adjusting said selector at intervals into positions dependent on the deflection of one meter element relative to the corresponding control member, and at other intervals into positions dependent on the deflection of the other meter element relative to its corresponding control member, control means associated with said selector and dependent on the position of the latter during the first mentioned intervals, and means associated with said selector and dependent on its position during the second mentioned intervals for adjusting the last mentioned control member relative to the corresponding meter element to vary their relative displacement.

14. In a control instrument comprising a plurality of meters responsive to different conditions and each of said meters comprising a deflecting element, a control member associated with each deflecting element, a selector element, means for adjusting said selector at intervals into positions dependent upon the relative position of one of said deflecting elements and the corresponding control member, and at other intervals into positions depending upon the relative positions of the other deflecting element and a control member associated therewith, a mechanism selectively controlled by said selector in accordance with the position of the latter during the first mentioned intervals, and another mechanism selectively controlled by said selector, depending upon the position of the latter during the second mentioned intervals.

15. In a control instrument, a deflecting meter element, a shaft, a control member mounted on said shaft and having an element engaging surface different portions of which are at different distances from the plane of movement of said element, means periodically turning said shaft to move said member towards said plane until said member engages said element and the movement of said shaft is arrested, a selector element, a yielding connection between said shaft and selector tending to turn the latter with the shaft, and means for temporarily locking said selector in the position assumed by it when said member and element engage, to permit said member and shaft to return to their original positions while said selector is so locked.

16. In a control instrument comprising two meters each having a deflecting element, a shaft, two control members mounted on said shaft and associated one with each of said deflecting members, means for oscillating said shaft, means for alternately connecting said control members to said shaft so that each member when connected to the shaft will be moved by the oscillation of the latter into engagement with the corresponding deflecting member and thereby arrest the motion of the shaft, said members and deflecting members being so relatively shaped that the extent of shaft movement depends upon the position into which the corresponding element is deflected when it is engaged by the member connected to the shaft, and a selector element moved by said shaft into positions dependent upon the position of the shaft when the motion of the latter is arrested by the engagement of either of said members with the corresponding deflecting element.

17. In a control instrument, the combination of a deflecting meter element, a control member, means periodically bringing said element and said member into engagement, means depending on said engagement for exerting selective control effects accordingly as the deflection of said elements effects its displacement relative to said member, and means depending on said engagements for periodically adjusting said member in a direction tending to vary such displacement, said means comprising a rotative part, a driving connection normally connected to said part and energized to rotate the latter to effect said periodical adjustments of said member, a second driving device for said part automatically operated, on the adjustment of said part out of a predetermined position by the first mentioned driving connection, to temporarily disconnect said connection and move said part toward its predetermined position.

18. In a control instrument comprising a deflecting meter element, a control member, means for periodically moving said deflecting element and control member relative to the plane of deflection of said element into contact with one another, said element and member having contact surfaces so shaped that the extent of such movement depends upon the extent to which said element is deflected relative to said member, means dependent on said engagement for adjusting said member to vary said displacement, said means comprising a gear wheel, a gear normally in mesh therewith, means for rotating the last mentioned gear to effect such adjustment, an operating part periodically acting on said gear wheel when the latter has been turned in either direction from a predetermined position to give it movements back toward said position, and means through which said part separates said gear wheel and gear during the periods in which it gives said gear wheel its movements.

19. In a control instrument, a pair of contacts, a contact device, means for giving said device a periodically recurring movement, and selective mechanism adjustable into different positions to correspondingly adjust said contacts relative to the path of movement of said device and thereby determine which of said contacts is engaged by said device on each of its movements and the duration of such engagement.

20. In a control instrument, a contact device, means for giving it a to and fro movement, a pair of cooperating contacts, a position controlling member for each contact, selective means for relatively adjusting said members into different positions in each of which one of said contacts is held out of the path of said contact device, and in which the portion of said path in which the other contact is held will depend on the position of the corresponding member.

21. In a control instrument, a pair of contacts, a contact device, means for moving it toward and away from said contacts, and means controlling the positions of said contacts including selective mechanism adjustable to different positions and adapted in each position of said mechanism to hold one or the other of said contacts out of the path of movement of said device and to hold the other contact in a portion of the path of movement of the device which depends upon the position of said selective mechanism.

22. In a control instrument, a pair of contacts, a contact device, means for giving the latter movements toward and away from said contacts, a pair of members associated one with and controlling the position of each of said contacts in an advanced position in which it is engaged by said device at an early stage in each movement of the latter toward the contacts, and a selector adjustable to different positions, said selector and members having engaging surfaces so relatively shaped that when said selector is at either side of a neutral position it holds a corresponding one of said members in a position in which the associated contact is out of the path of movement of said device, and holds the other member in such position that its associated contact projects into the path of movement of said device.

23. In a control instrument, a pair of contacts, a contact device, means for giving the latter movements toward and away from said contacts, a pair of members associated one with and controlling the position of each of said contacts in an advanced position in which it is engaged by said device at an early stage in each movement of the latter toward the contacts, and a selector adjustable to different positions, said selector and members having engaging surfaces so relatively shaped that when said selector is at either side of a neutral position it holds a corresponding one of said members in a position in which the associated contact is out of the path of movement of said device, and holds the other member in such position that its associated contact projects into the path of movement of said device to an extent dependent upon the extent to which said selector is then displaced from its neutral position.

24. In a control instrument, the combination with a deflecting element, of a control member, means for periodically bringing said member into engagement with said element and means controlled by each engagement of said member and element and dependent on the displacement of said element at the time of such engagement from a neutral point of said control member for giving the latter a movement proportional to said displacement in a direction to minimize said displacement.

25. In a temperature control device, a furnace, an element being heated by said furnace, a deflecting member, a second member periodically engaging said deflecting member, said second member having a normal position with respect to said deflecting member, means for operating said deflecting member in accordance with the temperature of said furnace, and means for operating said second member with respect to said deflecting member from said normal position in accordance with the temperature of said element.

26. In a control instrument, a control member, a deflecting element, said control member having a normal position with respect to said deflecting member, means for periodically bringing said control member and said deflecting element into engagement, means controlled by the engagement for moving said control member with respect to said deflecting element and means responsive to the movement of said control member with respect to said deflecting element for restoring said control member to said normal position.

27. In combination, a plurality of contact members, a contactor, said contact members being normally urged into engagement with said contactors, means for normally maintaining said contact members out of engagement with said contactors, means for removing said last mentioned means to release said contact members, and means for selectively permitting one of said released contact members to move into engagement with said contactors, said first mentioned means also moving said contactor to meet said contact members.

28. In combination, a plurality of contact levers, a contactor, means for normally maintaining said contact levers out of engagement with said contactor, said means being operative to release said contact levers simultaneously, means for selectively releasing one of said released contact levers to be moved into engagement with said contactor, cam operated means for moving said contactor to meet said contact lever, said cam means being arranged during the continued movement thereof for releasing said contactor to restore it to its original position, and for moving said contact lever out of engagement with said contact member.

29. In combination, a contact lever, a contact member, and cam operated means for moving said contact member into engagement with said contact lever, said cam member being so arranged as to release said contact member from engagement with said contact member during continued movement and for simultaneously moving said contact lever away from said contact member.

30. In combination, a contact lever, a contact member and cam operated means arranged to permit said contact lever and said contact member to engage and to release said contact lever and simultaneously move said contact member away from the point of contact during a single cycle movement thereof.

31. In a control device, a first deflecting member, periodically operated means engaging said deflecting member, a second deflecting member, a second means periodically engaging said second deflecting member, means responsive to the engagement of said second deflecting member with said second periodic means for adjusting said first mentioned periodic means with respect to said first mentioned deflecting member, said means simultaneously adjusting the second mentioned deflecting member with respect to said second periodic means.

32. In a control instrument, the combination with a deflecting meter element, of a control member adjustable in a path along which a portion of said element is moved as said element is deflected, and means for periodically moving said member toward the plane of movement of said element into engagement with the latter, comprising a periodically moving actuator and a rotating cam periodically connecting said member to and disconnecting it from said actuator.

33. In a control instrument, the combination with a deflecting meter element, of a control member adjustable in a path along which a portion of said element is moved by the deflection of the latter, means for periodically moving said member toward the plane of movement of said element comprising an actuator extending longitudinally of said path and movable transversely thereto, and means for periodically connecting said member to said actuator.

34. In a control instrument, the combination with a deflecting meter element, of a control member adjustable in a path along which a portion of said element is moved by the deflection of the latter, an actuator comprising a portion parallel to said path and having an oscillatory movement in a direction transverse to said path, a rotating shaft parallel to said path, a cam splined on said shaft and moved along the latter as said member is adjusted in said path, and means controlled by said cam for connecting said member to and disconnecting it from said actuator.

35. In a control instrument, the combination with a deflecting meter element, of a pivoted selector member, means for periodically adjusting said selector element into an angular position depending upon the then position of said deflecting element, a pair of contact control levers pivoted to turn about an axis parallel to the axis of said selector, said levers and selector having engaging surfaces so relatively shaped as to give said levers different angular positions according to the position of said selector, and control circuits, the energization of which is dependent on the positions of said levers.

36. In a control instrument, a selector element angularly adjustable about an axis and formed with an engaging part parallel to said axis, a pair of contact control levers each pivoted about an axis parallel to the first mentioned axis to move into and out of engagement with the latter, said part and members having engaging surfaces so shaped that the position of each member when in engagement with said part depends upon the angular position of said selector, a separate control circuit controlled by each lever, and means cooperating with said levers for periodically energizing one or another of said circuits according to the then position of said levers.

37. In a control instrument, a selector element angularly adjustable about an axis and formed with an engaging part parallel to said axis, a pair of contact control levers each pivoted to turn about an axis parallel to the first mentioned axis to move into and out of engagement with the latter, said part and said members having engaging surfaces so shaped that the position of each member when in engagement with said part depends upon the angular position of said selector, a separate control circuit controlled by each lever, and periodically operating means cooperating with said levers selectively energizing one or another of said circuits according to the position of said lever for a time interval depending on the position of the corresponding control lever.

38. In a control instrument a control member adjustable along a definite path, a deflecting meter element having a portion moving along said path as said element is deflected, means periodically bringing said element portion and member into engagement, means actuated by said engagement and dependent upon the displacement of said portion relative to a neutral point of said member for adjusting the latter along such path following each such engagement in the direction of said displacement and for a distance approximately equal to said displacement.

39. Control apparatus comprising in combination a meter element deflecting in response to variations in the quantity controlled, a control member adjustable to vary said quantity, a second member periodically brought into engagement with said element, means dependent upon the displacement of said element relative to a neutral point of said second member, when such engagement occurs, for adjusting each of said members in a direction tending to minimize said displacement, and other means dependent upon the displacement of said second member away from a neutral position of the latter for periodically effecting an adjustment of one only of said members tending to restore said second member to said neutral position.

40. Control apparatus comprising in combination a meter element deflecting in response to variations in the quantity controlled, a control member adjustable to vary said quantity, a second member periodically brought into engagement with said element, means dependent upon the displacement of said element relative to a neutral point of said second member when such engagement occurs, for adjusting each of said members in a direction tending to minimize said displacement, and other means dependent upon the displacement of said second member away from a neutral position of the latter for periodically effecting an adjustment of said member tending to restore the latter to said neutral position.

41. Furnace control apparatus comprising in combination means adjustable to vary the furnace heat supply, a meter deflecting in response to variations in a furnace temperature condition, a control member periodically brought into engagement with said element, means dependent upon the displacement when such engagement occurs, of said element relative to a neutral point of said control member for adjusting the first mentioned means and said member each in a direction tending to minimize said displacement, and other means dependent upon the displacement of said member away from a neutral position of the latter for periodical-ly adjusting said member toward its neutral position.

42. In a furnace control system, a member adjustable to vary the furnace heat supply and in combination therewith a control instrument comprising a control member adjustable along a definite path, a deflecting meter element having a portion moving along said path as said element is deflected, means periodically bringing said element portion and second mentioned member into engagement, means dependent on said engagement for exerting one or another of opposing control effects upon the first mentioned member accordingly as said element is displaced in one direction or another from a neutral point of the second mentioned member, means also dependent on such engagement for adjusting the second mentioned member along said path in a direction tending to minimize said displacement, and means dependent on the displacement of the second mentioned member from a predetermined position along said path for adjusting one of said members in a direction tending to minimize the last mentioned displacement.

43. The combination with a furnace, of a control system therefor tending to maintain a constant furnace heating effect and comprising means responsive to a furnace temperature condition and tending to maintain said condition at a constant value, and intermittently operating means responsive to a departure of said heating effect from a normal value for progressively adjusting the first mentioned means as required to restore said normal heating effect value.

44. In a control instrument comprising a plurality of meters responsive to different but related conditions of regulating mechanism subject to the immediate control of one of said meters and tending to maintain the quantity in which said meter responds at a constant value, and means controlled by another meter for intermittently modifying the action of the first mentioned meter on said regulating mechanism proportionally to the deflection of said other meter as required to maintain the quantity to which the last mentioned meter responds at a constant value.

45. The combination with an oil heater of a control system therefor, tending to maintain a constant heating effect and comprising means responsive to furnace temperature, means responsive to the temperature to which the oil is heated, furnace heat supply means periodically adjusted by the first mentioned means in a direction tending to minimize changes in furnace temperature, and means controlled by the second mentioned means for periodically effecting a system adjustment varying the furnace temperature which said system tends to maintain.

46. In heating material in a furnace, the method which consists in normally varying the furnace heat supply in inverse response to temperature changes at a point in the furnace at which a change in said supply produces a significant temperature change more quickly than in said material and periodically adjusting the relation between the rate of heat supply and the temperature at said point in response to changes in the temperature of said material.

47. In continuously heating oil in a tube heater, the method which consists in normally varying the rate of heat supply from said heater in inverse response to temperature changes in the furnace at a point therein at which a change in the heat supply produces a significant change in temperature more quickly than in the oil, and periodically adjusting the heat supply in response to changes in the temperature to which the oil is heated.

48. The combination with a material heating furnace, of means for adjusting the rate at which heat is supplied to said furnace, a controller for adjusting said means in inverse response to variations in furnace temperature, and a second controller periodically adjusting said means in response to changes in the temperature of material heated in said furnace.

49. An automatic control system for oil heaters having, in combination, a first meter and deflectable member responsive to temperature variations of the heater, a second meter and deflectable member responsive to temperature variations of the heated oil, a first control device having a normal corresponding to a definite furnace temperature and operated in accordance with deflections of the first member relative to said normal for regulating the heat supply to the heater to maintain said definite furnace temperature and a definite oil temperature, a second control device having a normal corresponding to said definite oil temperature and operated in accordance with deflections of the second member relative to said normal to relatively adjust the first member and the first control device thereby changing the furnace temperature to which the normal of the first control device corresponds and to which the first control device operates to maintain while maintaining the oil at the same definite temperature.

50. An automatic control system for oil heaters having, in combination, a first meter and deflectable member responsive to temperature variations of the heater, a second meter and deflectable member responsive to temperature variations of the heated oil, a first control device having a normal corresponding to a definite furnace temperature and operated in accordance with deflections of the first member relative to said normal for regulating the heat supply to the heater to maintain said definite furnace temperature and a definite oil temperature, a second control device having a normal corresponding to said definite oil temperature and operated in accordance with deflections of the second member relative to said normal to relatively adjust the first member and the first control device thereby changing the furnace temperature to which the normal of the first control device corresponds and to which the first control device operates to maintain while maintaining the oil at the same definite temperature, and means operated by the second control device for modifying the adjusting action of the second control device upon the first member and first control device.

51. An automatic control system for oil heaters having, in combination, a first meter and deflectable member responsive to temperature variations of the heater, a second meter and deflectable member responsive to temperature variations of the heated oil, a first control device having a normal corresponding to a definite furnace temperature and operated in accordance with deflections of the first member relative to said normal for regulating the heat supply to the heater to maintain said definite furnace temperature and a definite oil temperature, a second control device having a normal corresponding to said definite oil temperature and operated in accordance with deflections of the second member relative to said normal to relatively adjust the first member and the first control device thereby changing the furnace temperature to which the normal of the first control device corresponds and to which the first control device operates to maintain while maintaining the oil at the same definite temperature, and means operated by the second control device for relatively adjusting the second control device and the second member to modify the adjusting action of the second control device upon the first member and first control device.

52. An automatic control system for oil heaters having, in combination, a first meter and deflectable member responsive to temperature variations of the heater, a second meter and deflectable member responsive to temperature variations of the heated oil, a first control device having a normal corresponding to a definite furnace temperature and operated in accordance with deflections of the first member relative to said normal for regulating the heat supply to the heater to maintain said definite furnace temperature and a definite oil temperature, a second control device having a normal corresponding to said definite oil temperature and operated in accordance with deflections of the second member relative to said normal to relatively adjust the first member and the first control device thereby changing the furnace temperature to which the normal of the first control device corresponds and to which the first control device operates to maintain while maintaining the oil at the same definite temperature, and means operated by the second control device for relatively adjusting the second control device and the second member to modify the adjusting action of the second control device upon the first member and first control device, said means including mechanism for relatively adjusting the second control device and the second member so long as off-normal toward said normal corresponding to said definite oil temperature.

Signed at Philadelphia, in the county of Philadelphia, and State of Pennsylvania, this 16th day of June, A. D. 1927.

RICHARD P. BROWN.